United States Patent [19]

Gary

[11] 4,346,595

[45] Aug. 31, 1982

[54] CAT ALTITUDE AVOIDANCE SYSTEM

[76] Inventor: Robert A. Frosch, Administrator of the National Aeronautics and Space Administration, with respect to an invention of Bruce L. Gary, Pasadena, Calif.

[21] Appl. No.: 224,231

[22] Filed: Jan. 12, 1981

[51] Int. Cl.³ .................... G01C 21/00; G01N 1/08
[52] U.S. Cl. .................... 73/178 R; 73/170 R; 343/100 ME; 374/122; 374/123
[58] Field of Search ............ 73/178 R, 170 R, 355 R; 343/100 ME; 250/349

[56] References Cited

U.S. PATENT DOCUMENTS

| | | | |
|---|---|---|---|
| 3,359,557 | 12/1967 | Fow et al. | 73/170 R |
| 3,380,055 | 4/1968 | Fow et al. | 73/355 R |
| 3,402,295 | 9/1968 | Astheimer | 250/340 |
| 3,465,339 | 9/1969 | Marner | 343/100 ME |
| 3,475,963 | 11/1969 | Astheimer | 73/355 R |
| 3,689,924 | 9/1972 | Caruso, Jr. | 343/100 ME |
| 3,696,670 | 10/1972 | Collis | 73/170 R |
| 3,935,460 | 1/1976 | Flint | 250/349 |

*Primary Examiner*—Donald O. Woodiel

*Attorney, Agent, or Firm*—Monte F. Mott; John R. Manning; Paul F. McCaul

[57] ABSTRACT

A method and apparatus are provided for indicating the altitude of the tropopause or of an inversion layer wherein clear air turbulence (CAT) may occur, and the likely severity of any such CAT, which includes directing a passive microwave radiometer on the aircraft at different angles with respect to the horizon. The microwave radiation measured at a frequency of about 55 GHz represents the temperature of the air at an "average" range of about 3 kilometers, so that the sine of the angle of the radiometer times 3 kilometers equals the approximate altitude of the air whose temperature is measured. A plot of altitude (with respect to the aircraft) versus temperature of the air at that altitude, can indicate when an inversion layer is present and can indicate the altitude of the tropopause or of such an inversion layer. The plot can also indicate the severity of any CAT in an inversion layer. If CAT has been detected in the general area, then the aircraft can be flown at an altitude to avoid the tropopause or inversion layer. The detection method can also be utilized to enable an aircraft to fly at an altitude at which the winds are most favorable for reducing fuel consumption.

18 Claims, 9 Drawing Figures

CAT ALTITUDE AVOIDANCE SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The prediction of CAT (clear air turbulence) which results from wind shear, has been the subject of considerable effort. Such CAT generally occurs within areas of the atmosphere in which the tropopause or an inversion layer lie. The tropopause is the intersection of the troposphere and the stratosphere, and is an altitude at which air temperature increases with altitude. An inversion layer generally is a layer of air wherein the temperature of the air increases with altitude and which is embedded in a much deeper mass of air wherein temperature decreases with altitude. In these situations, CAT may occur in patches over an area of perhaps 100 kilometers which lies within an inversion layer of a width of perhaps 1000 kilometers, and a depth of 1000 to 3000 feet (300 to 1000 meters). Various devices have been proposed for avoiding CAT, as by the use of infrared or microwave radiometers to view regions directly in front or to scan to the left or right of the direction of flight of the aircraft, so that the aircraft can fly around areas of potential CAT or the pilot can know when to brace for a possible encounter with CAT. However, it is often impractical to fly around a large area where CAT might occur because of the wide area in which patches of CAT may be present, while knowledge as to the approach of a possible CAT region is often of limited benefit if avoidance cannot be accomplished. A system which facilitates the avoidance of regions of CAT, with minimal change in the original intended flight path, would be of great value.

SUMMARY OF THE INVENTION

In accordance with the present invention, a method and apparatus are provided which enable the detection of the height of the tropopause and of temperature inversions. The method includes directing a microwave radiometer in an aircraft, at the atmosphere, and scanning the viewing direction of the radiometer through a range of angular elevations from the horizontal, while measuring the microwave emission of the atmosphere over a limited bandwidth that is measured by the radiometer. The microwave measurements at the different angular elevations indicates the air temperature at different altitudes, and the measurements at a selection of altitudes enables the determination of altitudes at which air temperature does not decrease with altitude.

A radiometer can be utilized to detect microwave radiation at an $O_2$ emission band such as at about 55 GHz (i.e. 55,000 megahertz) wherein a weighted average range of air temperature measurement is about 3 kilometers. The weighted-average range is the distance from which 63% of the measured emission originates, or in other words beyond which 37% or 1/e of the emission originates. This average range of measurement times the sine of the elevation angle of the radiometer, indicates the altitude of the air whose radiation intensity, and therefore temperature, is being measured. When an aircraft approaches an area where CAT is likely, which may be identified as a result of reports from other pilots of CAT as well as detection from a separate sensor that a high potential for CAT exists, then the aircraft can be flown at an altitude above or below the tropopause or an inversion layer to avoid the CAT. Knowledge of the altitude of an inversion in the temperature profile (where temperature suddenly begins to increase with increasing altitude) can also be utilized to detect the altitude of the tropopause, and thereby enable the aircraft to be flown at an altitude where the prevailing winds are most favorable for minimizing fuel consumption for the particular direction of flight of the aircraft.

The novel features of the invention are set forth with particularity in the appended claims. The invention will best be understood from the following description when read in conjunction with the accompanying drawings.

DESCRIPTION OF THE PREFERRED EMBODIMENTS

Figure 4:
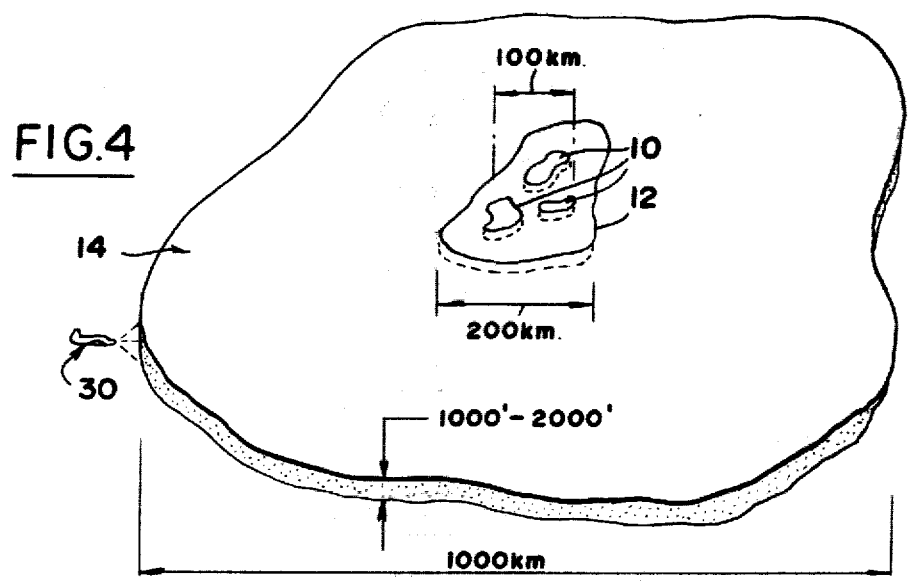
FIG. 4 is a simplified perspective view showing a typicl distribution of clear air turbulence and inversion layers containing them.

FIG. 4 is a simplified illustration of a region of the atmosphere in which CAT (clear air turbulence) resulting from wind shear is likely to occur. Our studies show that such CAT typically occurs in patches 10 lying within a generally turbulent region 12. Such turbulent regions 12 lie within an inversion layer 14 or near the tropopause such as within a layer that extends from about 2000 feet below to about 1000 feet above the tropopause. The entire inversion layer 14 has a thickness which is typically between 1000 and 3000 feet (300 to 1000 meters) and may have a width of perhaps 1000 km (kilometers). The general geographic location of the inversion layer 14 sometimes can be detected by weather service radiosondes. The location of the turbulent region 12 of an inversion layer or of the tropopause, can be detected by an instrument recently developed by Peter Kuhn et al., as described in Science Vol. 196 P. 1099, June 3, 1977. However, the CAT patches 10 cannot be remotely detected, although they occur within the inversion layer 14, or near the tropopause, and more specifically within the turbulent region 12. The inversion layer 14 is a region of limited depth wherein the temperature of the air increases, or at least does not substantially decrease, with increasing altitude. The tropopause is a location where the temperature of the air begins to increase with increasing altitude until it reaches a substantially constant temperature.

Figure 2:
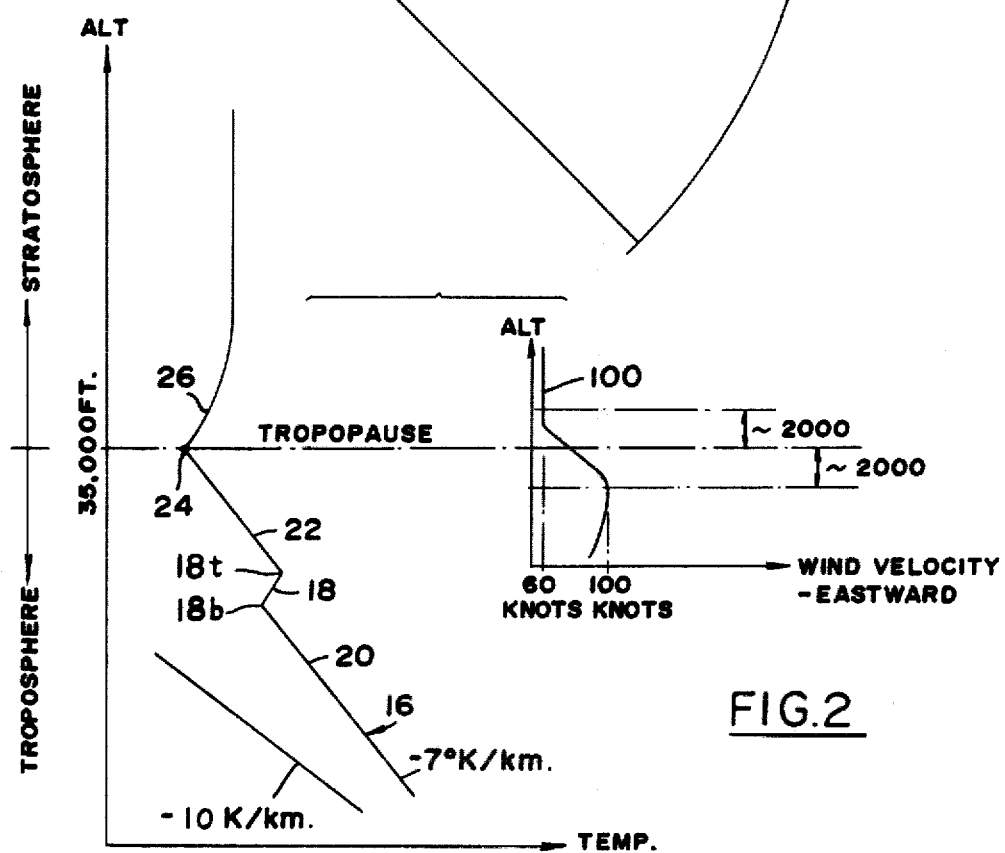
FIG. 2 displays a graph showing a typical altitude-temperature profile in which an inversion layer is detected, and also shows a typical variation in wind speed with altitude near the altitude of the tropopause.

FIG. 2 contains a graph 16 illustrating the relationship between altitude and the temperature of the air, in a typical situation where an inversion layer is present. The inversion layer is located along the graph portion 18 wherein temperature increases with altitude. At the regions 20, 22 immediately below and immediately above the inversion layer, the air temperature changes with altitude at a rate of about −7 degrees Kelvin per kilometer, which is a typicl quiescent atmospheric condition. The location of the tropopause is indicated at 24, this being the altitude at which the top of the troposphere interfaces with the bottom of the stratosphere, and which typically occurs at an altitude of about 35,000 feet, although the height does vary. At the graph portion 26 immediately above the tropopause, the air temperature typically increases with altitude for several thousand feet and then remains substantially constant at higher altitudes. Both the inversion layer and the region immediately above the tropopause may be defined as regions of temperature inversion wherein air temperature increases with altitude immediately above an air mass with a negative temperature-altitude characteristic (where temperature decreases with altitude). At the tropopause 24 and at the top 18$t$ and bottom 18$b$ of the inversion layer, a temperature-altitude inflection occurs at which the temperature-altitude slope suddenly changes. It may be noted that below the tropopause, the maximum negative slope of the altitude versus temperature graph that is encountered is −10° K/km.

One prior art approach to the prediction of an encounter with CAT has been to locate boundries between air masses of different temperatures (which is often an indication of an inversion layer). This can be accomplished by the use of radiometers which detect radiation emitted at a particular frequency or wavelength from air molecules, with the radiation intensity increasing with the temperature of the air. While such a technique could be useful in locating the general area of an inversion layer, it is not very practical in the avoidance of CAT patches within the inversion layer. While an inversion layer could be detected and avoided by flying around it, this is impractical. Even with recently developed detectors, that can detect the turbulent region 12 which is of more limited size, it is generally impractical to fly around the wide area of even this region. The scanners have been useful in warning of the danger of CAT, so that aircraft flying at perhaps 0.86 mach can slow down to minimize the effect of CAT. At present, the rising cost of fuel has resulted in jet liners already flying at a lower speed such as 0.82 mach to conserve fuel, so that even knowledge as to the increased possibility of encountering CAT is not as useful. However, even at the somewhat lower speeds, CAT can be dangerous, and it would be of considerable value to be able to avoid CAT if this could be done without greatly altering the flight path of the aircraft.

Figure 6:
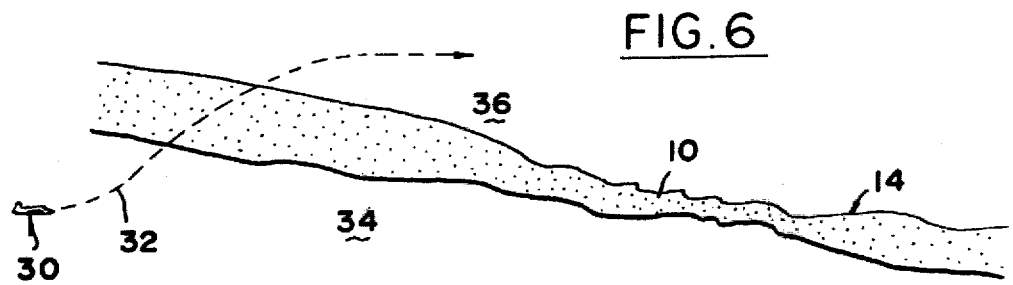
FIG. 6 is a side elevation view showing how an aircraft can be flown to avoid a region of clear air turbulence.

In accordance with the present invention, a system is provided for measuring the altitude of temperature inversions to enable an aircraft to avoid flight within an inversion layer or at an altitude close to the tropopause when there is a high possibility of CAT. Instead, the aircraft can be flown at a different altitude than the altitude of the temperature inversion. For example, FIG. 6 illustrates an inversion layer 14 and an aircraft 30 which is flying in the same general region as that which contains the inversion layer. A system of the present invention is utilized to determine the altitude of the inversion layer, as will be described below. If the aircraft is flying below the inversion layer, and the height of the inversion layer is constantly decreasing in progression along the flight path, then the aircraft may be directed along the flight path 32 to quickly pass through the inversion layer and thereafter fly above it. It may be noted that in FIG. 6, the inversion layer is formed by air masses 34, 36 of different temperature (e.g. 10° K.) and velocity, and that CAT appears to occur in patches 10 where the depth of the inversion layer decreases.

In accordance with the present invention, the measurement of the altitude of a temperature inversion is accomplished by the use of a microwave radiometer on the aircraft, with the radiometer tuned to a frequency which enables it to sense temperature at a weighted average range on the order of 3 kilometers, and with the viewing direction of the radiometer being scanned in elevation angle. Oxygen molecules in the atmosphere interact strongly with electromagnetic radiation at about 60 gigahertz ($60 \times 10^9$ hertz), and as a result produce thermal emission radiation at about this frequency. The amount of radiation from oxygen molecules which survives absorption at a particular distance from the emission, varies greatly with moderate changes in frequency. For example, at 60 GHz only about 4% of oxygen emission survives at a distance of about 1 kilometer at sea level, while at 56 GHz about 20% survives. When a radiometer which is detecting oxygen emission of a limited frequency band, such as within about 0.2 GHz of a center frequency such as 55.3 GHz, is directed at the atmosphere, it responds to emission from both distant and close molecules, but responds to emission at a weighted-average distance of about 3 kilometers when utilized at an altitude at about 30,000 feet. The actual response to emission from molecules decreases with distance exponentially and this is referred to as a weighting function.

Figure 3A:
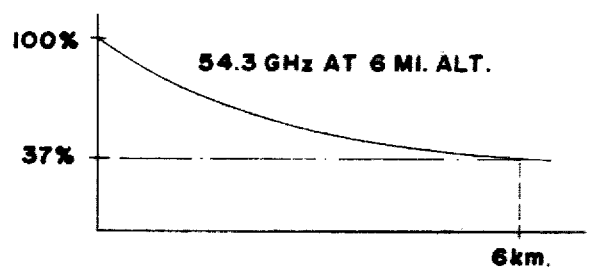
FIGS. 3A-3C illustrate how the "average" range of temperature detection varies with the frequency of the detected microwaves.
Figure 3B:
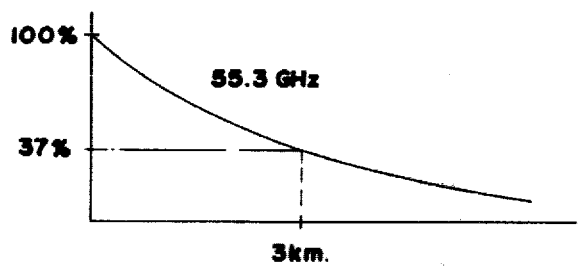

FIG. 3B shows how the proportion of emission from oxygen molecules that are all of the same temperature, decreases with distance for emissions at a microwave frequency of 55.3 GHz and an altitude of about 30,000 feet (about six miles), the figure representing the weighting function for the emission. At a distance of about 3 kilometers the detected radiation at this frequency is about 37% of the emitted radiation. The 37% level represents 1/e (where e is the base of the natural logarithm system). About 37% of the detected radiation is at a greater distance than 3 km, and the other 63% originates from less than a 3 km distance. Although other averages can be utilized, the weighted-average distance (beyond which 37% of the emissions of that distance are detected) usually provides the most accurate indication of temperature. Where air temperature changes linearly with distance, the measured temperature is the temperature at the weighted average distance.

Figure 3C:
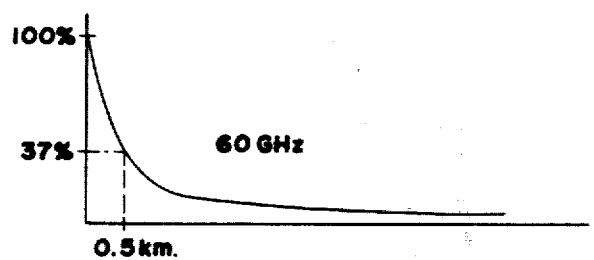

FIG. 3A shows the weighting function for oxygen molecule emission in the atmosphere at 54.3 GHz and 30,000 feet altitude, showing that the 1/e or 37% level is at about 6 km. Similarly, FIG. 3C shows that at 60 GHz and the same 30,000 foot altitude, the 37% level is at a range of about 0.5 km. Thus, as microwave frequencies lower than 54 GHz are utilized to detect oxygen emissions, emission from greater distances are detected. However, the altitude resolution at which a particular temperature feature exists is much poorer when a frequency lower than 54 GHz (or higher than 66 GHz) is utilized. A range of about 3 km, obtained by the use of a frequency of about 55.3 GHz (or about 65 GHz as will be discussed below) at an altitude of about 30,000 feet, is great enough to detect temperature inversions close enough to the altitude of the aircraft to be of interest in CAT avoidance. This range of about 3 km is also small enough to provide considerable resolution to determine the approximate height at which temperature changes occur, and thereby enable the altitude location of the top and bottom of an inversion layer and the rate of air temperature change with altitude within the layer.

Figure 1:
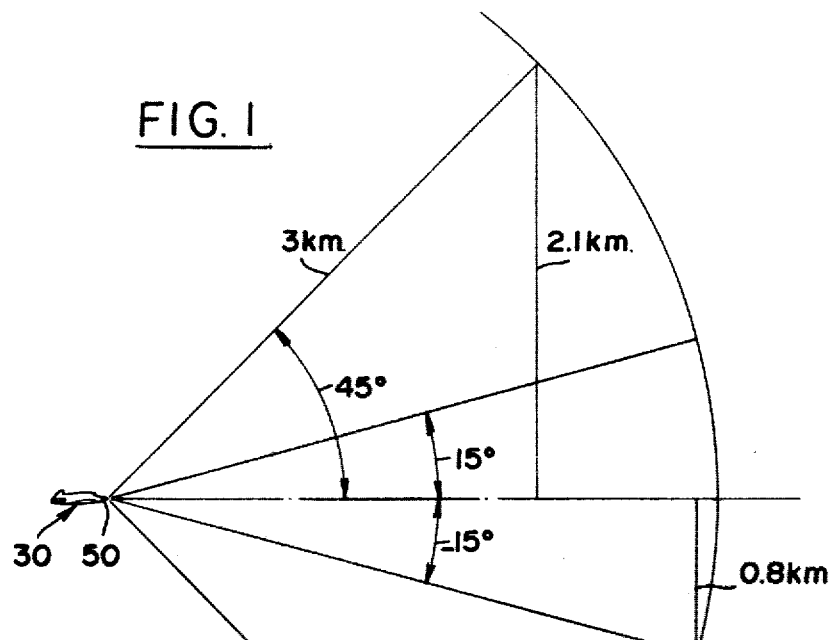
FIG. 1 is a side elevation view indicating the method of operation of the system of the present invention.

FIG. 1 illustrates the manner in which a radiometer on the aircraft 30 can be utilized to measure properties of the tropopause and of inversion layers. The radiometer, indicated at 50, is a well known type of microwave radiometer which includes a horn for receiving radiation and a waveguide connected to the throat of the horn antenna to carry microwaves of less than a certain wavelength to a mixer-amplifier and other processing circuitry. The horn is mounted so it can be rotated about a horizontal axis to scan within a wide range of elevation angles, such as between −45° and +45° with respect to the horizon when the aircraft is flying horizontally. The radiometer circuitry is operated to measure radiation of a limited bandwidth about a predetermined frequency such as 55.3 GHz, which results in the radiometer measuring the air temperature at a weight average distance of about 3 kilometers. When the radiometer is directed at a +45° elevation angle, it detects the air temperature at an altitude of 3 kilometers times sin 45°, or in other words at an elevation of 2.1 km above the altitude of the aircraft (and at a point which is at a horizontal distance of 2.1 km, although this is of no importance herein). When the radiometer is directed at −15°, it measures the air temperature at an altitude of 0.8 km below the aircraft altitude. Thus, by directing the radiometer at a plurality of different elevation angles with respect to the horizontal, and measuring the radiation received at a particular frequency, the apparatus of the present invention is able to provide an estimate of the temperature of the air at various elevation distances or altitudes above and below the aircraft. It should be noted that various directional microwave antennas can be utilized, including a horn-fed parabolic reflector-antenna and a phased array antenna.

Figure 5:
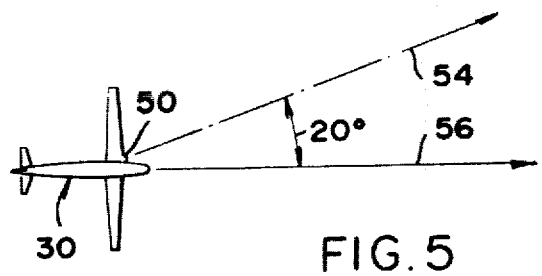
FIG. 5 is a plan view of the aircraft of FIG. 1, showing how the azimuth of the radiometer detection viewing direction can be angled from the flight path of the aircraft.

The particular altitude of the atmosphere whose temperature is measured depends upon the particular wavelength, or frequency, of the microwave radiation which is measured. A frequency is chosen which provides a range such as 3 km, that enables measurement at altitudes of greatest interest such as within one or two km (within 3,000 or 7,000 feet) above and below the aircraft. It should be noted that the particular azimuth at which the radiometer is directed is not of great importance since the inversion layer or tropopause to be detected covers a large horizontal area compared to a range of perhaps a few kilometers of the radiometer. In many instances, the radiometer cannot be installed in the nose of the aircraft, and must be installed in another location such as a wheel well or within the leading edge of a wing. Since the radiometer detects radiation within an appreciable angle, such as where it has a halfpower beamwidth of about 7°, it could be blocked by the nose of the aircraft, and the radiometer may be directed at an azimuth angle that differs from the flight direction of the aircraft. FIG. 5 shows an installation wherein the radiometer 50 is pointed in an azimuth 54 which is angled by 20° from the azimuth 56 of the flight path of the aircraft. It is even possible to direct the radiometer rearwardly with respect to the flight of the aircraft.

Figure 7:
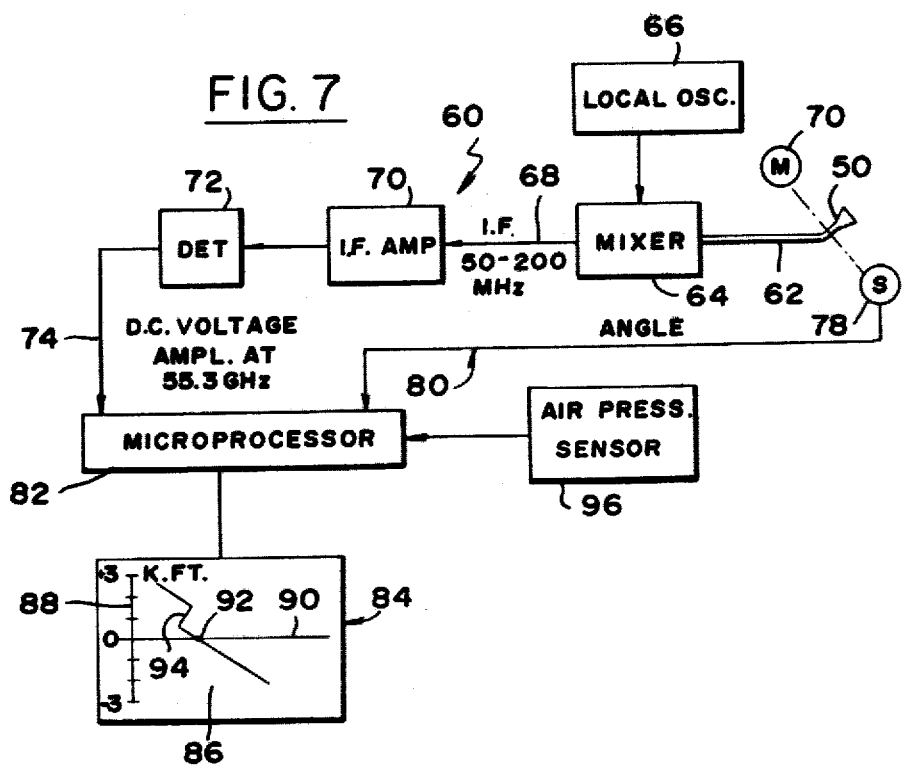
FIG. 7 is a block diagram of a radiometer constructed in accordance with the present invention.

FIG. 7 illustrates a radiometer apparatus 60 installed in an aircraft, which can be utilized to measure altitude temperature profiles. The system includes a horn antenna radiometer 50 whose output is delivered through a waveguide 62 to a mixer/pre-amplifier and filter circuit 64. A signal from a local oscillator 66 is mixed with the radio frequency input to the mixer 64, to produce an intermediate frequency output on line 68. For example, the local oscillator can be set to produce an i.f. signal on line 68 corresponding to radio frequencies that are slightly above and below a 55.3 GHz local oscillator frequency. The i.f. signal is delivered to an i.f. amplifier 70 whose output is detected by a detector 72. The output on line 74 from the detector is a DC voltage whose amplitude is proportional to the amplitude of the microwave radiation detected by an horn antenna 50 at a frequency of about 55.3 GHz (and to other noise generating components of the radiometer) and specifically within a bandwidth of 50 to 220 MHz above and below the 55.3 GHz frequency.

The horn antenna radiometer 50 can be tilted over a wide range of elevation angles by a stepper motor 76. The elevation angle of the horn antenna 50 is detected by a position sensor 78 whose output is delivered over line 80 to a processing circuit such as a microprocessor 82. The microprocessor also receives the output on line 74 representing the intensity of microwave radiation detected from the atmosphere. The microprocessor 82 is utilized to drive a video display device 84 to generate a display 86 representing the altitude of the air relative to the aircraft and the temperature of the air at each of the altitudes. The particular altitude (relative to the aircraft) at which the air temperature is measured, equals the "average" range of measurement, such as 3 km, times the sine of the elevation angle of the radiometer. The particular display 86 includes an ordinate 88 showing the altitude of the air with respect to the altitude of the aircraft, and contains an abscissae 90 indicating the temperature at the different altitudes. The point 92 where the altitude-temperature graph crosses the 0 altitude point, represents the temperature of the air immediately surrounding the aircraft. The particular graph of the display 86 includes a portion 94 indicating that an inversion layer lies about one thousand feet above the altitude of the aircraft. If there have been reports of turbulence in this general area, or if other sensors indicate that the aircraft is approaching a region where turbulence is likely to occur, then flight level changes can be made to assure that the aircraft is not flown close to or within the indicated inversion layer.

The display 86 is useful not only in determining the altitude of the tropopause, and the altitude of an inversion layer including the top and bottom thereof, but also in indicating the severity of any CAT that might be found in an inversion layer. The severity of any CAT in an inversion layer increases as the lapse rate (the positive slope of the temperature-altitude curve) and the thickness of the inversion layer increase. If the likely severity is low, no avoidance may be required, while if the likely severity is great then avoidance may be indicated (by flying at a different altitude) even if no reports of CAT in the area have been received and no indication of CAT has been given by other sensors.

It should be noted that the average range of the radiometer at a particular frequency increases as the density of the air decreases. The density changes primarily with altitude. Accordingly, a pressure gauge 96 that senses the pressure of the ambient air is coupled to the microprocessor to enable adjustments to be made to the assumed range of the radiometer. It also may be noted that the output of the radiometer circuit including the radiometer 50 may not be proportional to the intensity of radiation, and the microprocessor can be programmed to compensate for this. The radiometer output will include a component representing air temperature of perhaps 300° K., and a system noise temperature of perhaps 300° K. in an uncooled system. Accordingly, a voltage representing system noise may be subtracted from the voltage output of the detector 72, to obtain the portion representing air temperature. This portion representing air temperature without noise, may not be proportional to air temperature, and the nonlinearly can be determined during calibration.

While the microprocessor 82 of the radiometer apparatus can be programmed to calculate the altitude by multiplying range by the sine of the elevation angle, and the temperature by multiplying the detector output (minus a predetermined constant) by another predetermined constant determined during calibration, it is also possible to merely indicate the elevation angle versus radiometer output. However, since altitude and temperature are concepts whose significance is more easily appreciated by people, such conversion is usually desirable when the values are to be displayed to persons. While the altitude at which a certain air temperature exists can be calculated by multiplying the assumed range (e.g. 3 km) by the sine of the elevation angle, better altitude resolution can be obtained by employing one of several available retrieval algorithms for converting observed brightness temperatures (radiometer output as adjusted for radiometer-generated noise, nonlinearity etc., as can be determined by calibration) versus elevation angle to "air temperature versus altitude". Well known algorithms such as the Backus-Gilbert retrieval algorithm or the multiple regression retrieval algorithm can be utilized, wherein "averaging kernals" (differences between weighting functions) are calculated. The use of such algorithms provides a more accurate indication of the altitude-temperature profile and results in the sharp temperature-altitude inflections shown at 18t, 18b and 24 in FIG. 2. Such algorithms will normally be utilized because of the relatively low cost of the computing circuitry required to implement them.

Although a 55 GHz frequency is useful in detecting emissions from $O_2$ in the atmosphere, two other frequencies of about 65 GHz and about 118 GHz can be used instead. $O_2$ emission-abortion features are approximately symmetrical about 60 GHz. Thus, 55 GHz and 65 GHz frequencies each provide a range of about 3 km at an altitude of 30,000 feet. At 53 GHz and 67 GHz, the range is about 12 km (at 30,000 feet), which is not useful herein except in a general survey of temperature-altitudes. The preferred frequency varies with altitude, so that a range of 3 km is obtained at 56 GHz and 64 GHz for an aircraft flying at about 40,000 feet, a range of 3 km is obtained at 57 GHz and 63 GHz at about 55,000 feet at which supersonic aircraft may fly, and even a 60 GHz frequency may be useful for extremely high flying aircraft (because inversion layers and CAT can occur even in the stratosphere). An $O_2$ emission-absorbtion feature also occurs near 118 GHz, although over a much narrower range of frequencies such as from 117 GHz to 119 GHz than occurs near 60 GHz. While microwave measurement at about 118 GHz can be utilized, the i.f. bandwidth must be smaller, such as from 10 to 100 MHz, as compared to the 50 to 200 MHz bandwidth near 60 MHz, which results in more noise and reduced sensitivity. It is also difficult to obtain microwave components for such high frequencies since microwave technology presently has not been as well developed therefor. However, the 118 GHz frequency can be utilized. Thus, microwave measurements can be made in the 53 to 67 GHz and 117–119 GHz spectrum. A frequency of about 55 GHz has been utilized in tests because of the availability of microwave circuit components.

The radiometer apparatus 60 can be utilized by first operating the local oscillator 66 so that the i.f. signal on line 68 represents microwaves at a frequency such as 54.3 GHz to extend the range of detection to perhaps 6 km (at 30,000 feet altitude), so as to enable the detection of an inversion layer at an altitude somewhat above or below the range later utilized to keep closer track of the altitude and thickness of the inversion layer.

While the system of the present invention is useful in locating the altitude of temperature inversions, as occurs in inversion layers and at the tropopause, to enable avoidance thereof, it also can be utilized to fly an aircraft at an altitude of optimum tail wind or head wind. As shown in the graph 100 in FIG. 2, which shows altitude vs. eastward wind velocity, the wind velocity normally changes with altitude near the altitude of the tropopause. In most of the United States, the wind velocity about 2000 feet below the tropopause is considerable, such as about 100 knots in an eastward direction, while at an altitude a few thousand feet above this altitude the wind velocity may be only 60 knots (in an eastward direction). Thus, if a pilot can detect the local altitude of the tropopause, then when he is flying eastwardly he can fly about 2000 feet below the tropopause altitude to obtain a maximum tailwind. The local tropopause altitude can be detected by noting that the temperature suddenly stops decreasing with altitude above the tropopause and often increases with altitude, and with the temperature approaching a constant level at progressively increasing altitudes. Also, it is known that the tropopause normally occurs at altitudes of about 30,000 to 45,000 feet, so that a detection near this altitude of increase in temperature with altitude with no indication of a return to the decreasing temperature-with-altitude condition thereabove, would strongly indicate that the altitude is that of the tropopause.

Thus, the invention provides a method and apparatus for sensing temperature variations with altitude, as in sensing temperature inversions and temperature inflections, and which is useful in detecting the altitude and thickness of an inversion layer as well as in detecting the local height of the tropopause. This is accomplished by directing a microwave radiometer from the aircraft into the atmosphere, and operating the radiometer to detect radiation over a range of angular elevations from the horizontal at a constant azimuth. The radiometer apparatus is operated to detect microwave radiation of a limited frequency band within the 53 to 67 GHz and 117 to 119 GHz frequency spectrum. By locating layers within which air temperature does not substantially decrease with altitude, or where it actually increases with altitude, the apparatus can detect the local altitude of an inversion layer. Tropopause features can be detected in a similar manner. Such detecting can be by the display on a video screen of the relationship between altitude and air temperature, or by other outputs such as in the form of a graph, numbers, or meter reading, to indicate a temperature inversion. Information as to the altitude and thickness of an inversion layer or the altitude of the tropopause, can be useful to select the flight path of an aircraft to avoid the temperature inversion when other information indicates that clear air turbulence is likely to occur in the region. The apparatus is also useful to enable an aircraft to fly at an altitude with respect to the altitude of the tropopuase at which it will encounter the most favorable tail winds (or least favorable head winds).

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for sensing temperature inversion relative to an aircraft comprising:
   directing a microwave radiometer, mounted in the aircraft, into the atmosphere, to receive microwaves at each of a plurality of different angular elevations from the horizontal;
   measuring an output of the radiometer at each of said elevations; and
   determining elevations at which the output does not substantially decrease with increasing elevation angles.

2. The method described in claim 1 wherein:
   said step of measuring includes measuring radiation at a frequency which is in the 53 to 67 GHz and 117 to 119 GHz frequency spectrum.

3. The method described in claim 1 wherein:
   said step of measuring includes measuring radiation of between about 55 GHz and 57 GHz.

4. The method described in claim 1 wherein:
   said step of measuring includes measuring radiation of between about 63 GHz and 65 GHz.

5. The method described in claim 1 wherein:
   said step of determining includes measuring radiation at a predetermined frequency and generating altitude-indicating signals representing substantially the sine of the elevation angle of the radiometer times the weighted average range over which the radiation at that particular frequency was generated.

6. The method described in claim 1 wherein:
   said step of determining elevations includes indicating the depth and lapse rate of an inversion layer.

7. The method described in claim 1 wherein:
   said aircraft moves in a flight direction and said step of directing includes directing the radiometer at a substantially constant azimuth which is angled from the azimuth of the flight direction of the aircraft.

8. The method described in claim 1 wherein:
   said step of determining includes deriving an altitude-temperature profile from a retrieval algorithm analysis of the observed radiometer outputs at the respective elevation angles.

9. A method for sensing altitude of potential clear air turbulence, comprising:
   measuring microwave radiation in each of a plurality of directions which are at different angular elevations, from an aircraft, at a limited microwave frequency band which is near one of the frequencies of the group which consists of 55 GHz, 65 GHz and 118 GHz; and
   generating signals representing substantially the intensity of each of said microwave measurements, and the sine of the elevation angle at which each of the measurements was made multiplied by a range representing a weighted-average range over which the radiation was generated, to thereby provide signals that can indicate the variation of air temperature with altitude relative to the altitude of the aircraft.

10. The method described in claim 9 wherein:
    said step of generating includes indicating the altitudes of the upper and lower elevations of inversion layers.

11. The method described in claim 9 wherein:
    said step of generating includes indicating the altitude of the tropopause.

12. A method for efficiently operating an aircraft, comprising:
    detecting the local altitude of the tropopause, including directing a radiometer at a plurality of different elevation angles, from an aircraft, measuring the intensity of microwave radiation near a predetermined frequency at each of said angles, and determining the altitude at which air temperature ceases to decrease appreciably with increased elevation; and
    operating the aircraft, so when it travels eastwardly it flies at an altitude on the order of magnitude of 2000 feet below the local tropopause.

13. The method described in claim 12 wherein:
    said step of operating the aircraft, includes flying it at an altitude at least about 2000 feet above the tropopuase, when flying the aircraft in a westerly direction.

14. Apparatus for installation in an aircraft to sense the temperature profile of the atmosphere comprising:
    a microwave radiometer apparatus, including a directional radiometer, and a circuit for measuring microwaves of a limited bandwidth received by the radiometer;
    means for mounting said radiometer apparatus in an aircraft so the radiometer can be tilted in elevation, and including means for tilting said radiometer to measure microwaves at selected angular elevations; and
    means responsive to the output of said circuit and the angular elevation of said radiometer, for indicating the elevations at which air temperature does not decrease significantly with altitude.

15. The apparatus described in claim 14 wherein:
    said means responsive to the output includes a processing circuit which generates signals representing the altitude of the air whose radiation is measured, said signals representing the sine of the elevation angle of the radiometer from the horizontal multiplied by a range representing an average range over which radiation from the air is detected in said bandwidth, and a video display device which generates a video display showing the relationship between air temperature as indicated by the microwave intensity detected by said radiometer apparatus and the altitude of the air giving rise to that indicated temperature.

16. The apparatus described in claim 14 wherein:
    said video display shows the relationship between air temperature and altitude as obtained from a retrieval algorithm analysis of the observed microwave intensity versus a function of elevation angle.

17. The apparatus described in claim 14 wherein: said mounting means directs the viewing direction of said radiometer at a constant azimuth direction which is angled from the flight direction of the aircraft.

18. The apparatus described in claim 14 wherein: said radiometer apparatus is constructed to detect microwaves of a frequency within the 53 to 67 GHz and 117 to 119 GHz frequency spectrum.

* * * * *